US008253395B2

(12) United States Patent
Irissou et al.

(10) Patent No.: US 8,253,395 B2
(45) Date of Patent: Aug. 28, 2012

(54) BUS VOLTAGE OPTIMIZER FOR SWITCHED POWER CONVERTER

(75) Inventors: Pierre Irissou, Sunnyvale, CA (US); Etienne Colmet-Daage, Los Altos, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 639 days.

(21) Appl. No.: 12/536,596

(22) Filed: Aug. 6, 2009

(65) Prior Publication Data

US 2010/0033150 A1 Feb. 11, 2010

Related U.S. Application Data

(60) Provisional application No. 61/086,815, filed on Aug. 7, 2008.

(51) Int. Cl.
G05F 1/00 (2006.01)
(52) U.S. Cl. .......................................... 323/266; 363/65
(58) Field of Classification Search .................. 323/266, 323/267; 363/65; 307/12
See application file for complete search history.

(56) References Cited

U.S. PATENT DOCUMENTS

| 6,903,536 | B2* | 6/2005 | Yang | 323/266 |
| 2004/0056644 | A1 | 3/2004 | Wang | |
| 2005/0140347 | A1 | 6/2005 | Chen et al. | |
| 2005/0225307 | A1 | 10/2005 | Sato et al. | |
| 2005/0231183 | A1 | 10/2005 | Li et al. | |
| 2007/0195568 | A1 | 8/2007 | Sato | |
| 2007/0291520 | A1 | 12/2007 | Schuellein | |
| 2009/0296432 | A1* | 12/2009 | Chapuis | 363/65 |

FOREIGN PATENT DOCUMENTS

| JP | 10-341572 A | 12/1998 |
| JP | 2008-148473 A | 6/2008 |

OTHER PUBLICATIONS

PCT/US2009/053103, filed Aug. 7, 2009, International Search Report mailed Mar. 25, 2010, 3 pages.

* cited by examiner

*Primary Examiner* — Harry Behm
*Assistant Examiner* — Matthew Grubb
(74) *Attorney, Agent, or Firm* — Holland and Hart LLP

(57) ABSTRACT

Methods, systems, and devices are provided for optimizing a bus voltage supplied to a switching power converter to keep the duty cycle of the switching power converter to within a desirable operating range. In some embodiments, the duty cycle of the switching signal used to drive the switching power converter is monitored (e.g., indirectly) to determine whether the duty cycle is approaching an undesirable level. For example, as the duty cycle decreases (e.g., approaches or crosses a certain threshold), embodiments decrease the bus voltage. This may, in turn, allow the switching power converter to output substantially the same output to the load, while using a more efficient (e.g., larger) duty cycle. Certain embodiments use similar techniques, along with certain bus voltage optimization techniques, to control a bus voltage as a function of feedback from multiple switching power converters.

25 Claims, 6 Drawing Sheets

BUS VOLTAGE OPTIMIZER FOR SWITCHED POWER CONVERTER

CROSS-REFERENCES

This application claims the benefit of and is a non-provisional of U.S. Provisional Application Ser. No. 61/086,815, filed on Aug. 7, 2008, titled "BUS VOLTAGE OPTIMIZER FOR SWITCHED POWER CONVERTER," which is hereby expressly incorporated by reference in its entirety for all purposes.

BACKGROUND

This disclosure relates to power circuits in general and, in particular, to switching converter circuits.

Many electronics applications use switching power converters to convert a DC bus voltage to an appropriate load voltage. For example, a load may desire conversion of mains line voltage to 12-volt DC voltage. A first conversion stage may convert the high-voltage AC mains line voltage to a high-voltage DC bus voltage (e.g., while also providing power factor correction). A second stage may then convert the high-voltage DC bus voltage to the appropriate low-voltage DC load voltage, as desired.

In many applications, the second stage converter may be a switching converter that generates a desired output level by switching at a particular duty cycle. While the converter may adjust its duty cycle to maintain a desired output level, the efficiency of the converter may change over a certain range of duty cycles. For example, the efficiency may increase as the duty cycle approaches 100 percent. As such, some typical switching converters may be limited in their ability to adapt to changing output conditions while maintaining high efficiency.

SUMMARY

Among other things, embodiments provide methods, systems, and devices for adapting to changing output conditions while maintaining relatively high efficiency, even in the context of multiple switching converters.

For example, embodiments optimize a bus voltage supplied to one or more switching power converters to keep their switching duty cycles to within an efficient operating range. As the duty cycle decreases, the bus voltage may be decreased. With a lower bus voltage, it may be possible to drive the converter with a larger duty cycle, while still generating comparable output to the load. Similarly, if the duty cycle exceeds a certain level (e.g., such that there is insufficient headroom to handle ripple), it may be desirable to increase the bus voltage to allow the duty cycle to decrease.

In one set of embodiments, a circuit is provided. The circuit includes a converter controller unit, operable to: generate an output error as a function of monitoring an output level of a converter unit with respect to a target output level and control the duty cycle of the switching signal as a function of the output error; and a bus controller unit, communicatively coupled with the converter controller unit, and operable to: generate a bus control signal as a function of the duty cycle of the switching signal; and adjust the bus voltage level as a function of the bus control signal such that the duty cycle of the switching signal is maintained substantially within a predefined operational range.

In another set of embodiments, a method is provided for controlling a switching power converter. The method includes monitoring an output level of a converter unit with respect to a target output level, the converter unit being configured to generate an output level as a function of a duty cycle of a switching signal and a bus voltage level; generating an output error as a function of monitoring the output level; controlling the duty cycle of the switching signal as a function of the output error; generating a bus control signal as a function of the output error; and adjusting the bus voltage level as a function of the bus control signal such that the duty cycle of the switching signal is maintained substantially within a predefined operational range.

In still another set of embodiments, a circuit is provided. The circuit includes an optimizer unit, communicatively coupled with a number of bus controller units, and operable to: receive a number of bus control signals, each bus control signal being generated by a respective one of the number of bus controller units as a function of a duty cycle of a switching signal adapted for use in driving at least one of a number of switching converter units communicatively coupled with the respective one of the number of bus controller units; generate a bus optimizer signal as a function of the number of bus control signals; and adjust a bus voltage level as a function of the bus optimizer signal, the bus voltage level being tied to the number of switching converter units, such that the duty cycles of the switching signals are maintained substantially within respective predefined operational ranges.

And in another set of embodiments, a method is provided for controlling multiple switching power converters. The method includes receiving a number of bus control signals, each bus control signal being generated by a respective one of the number of bus controller units as a function of a duty cycle of a switching signal adapted for use in driving at least one of a number of switching converter units communicatively coupled with the respective one of the number of bus controller units; generating a bus optimizer signal as a function of the number of bus control signals; and adjusting a bus voltage level as a function of the bus optimizer signal, the bus voltage level being tied to the number of switching converter units, such that the duty cycles of the switching signals are maintained substantially within respective predefined operational ranges.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Among other things, methods, systems, and devices are provided for optimizing a bus voltage supplied to a switching power converter to keep the duty cycle of the switching power converter to within a desirable operating range. In some embodiments, the duty cycle of the switching signal used to drive the switching power converter is monitored (e.g., indirectly) to determine whether the duty cycle is approaching an undesirable level. As the duty cycle decreases (e.g., approaches or crosses a certain threshold), embodiments decrease the bus voltage. This may, in turn, allow the switching power converter to output substantially the same power (e.g., or current, etc.) to the load, using a larger duty cycle.

It will be appreciated that, as used herein, optimization is intended to be broadly construed to mean acting to find a more optimum (e.g., improved) result. For example, when optimizing the bus voltage for a single converter unit, multiple other bus voltage may be considered more optimum under particular sets of criteria. Similarly, when optimizing bus voltages for multiple converters, some bus voltages that are optimal for one converter may not be optimal for other converters. As such, words like "optimum" and "optimize," and components like the "optimizer unit," as used herein, are not intended to limit the scope of the invention.

Figure 1:
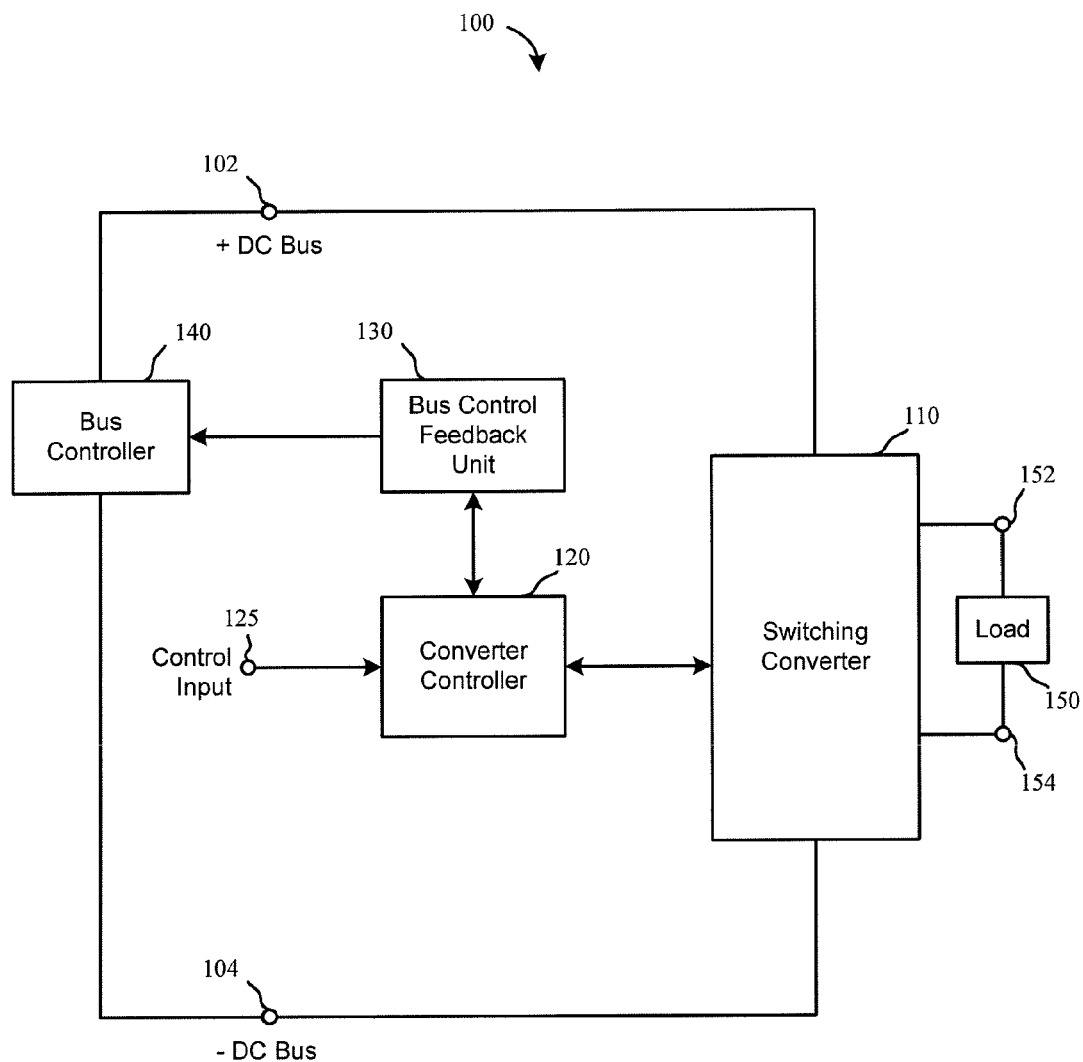
FIG. 1 shows a simplified block diagram of a power system for optimizing a bus voltage supplied to a switching power converter, according to various embodiments of the invention.

FIG. 1 shows a simplified block diagram of a power system for optimizing a bus voltage supplied to a switching power converter, according to various embodiments of the invention. The system 100 includes a switching converter unit 110 configured to drive a load 150. The switching converter unit 110 may be any type of power converter that uses switching to generate a load voltage, including, for example, a buck converter, boost converter, flyback converter, hard-switching converter, soft-switching converter, etc.

In some embodiments, the switching converter unit 110 is configured to convert a DC bus voltage (e.g., the voltage between a positive DC bus voltage rail 102 and a negative DC bus voltage rail 104) to power the load 150 in a desirable way. In some embodiments, the negative DC bus voltage rail 104 is tied to ground. For the sake of clarity, references to the DC bus voltage herein typically refer to the DC bus voltage rail 102 (i.e., assuming that the negative DC bus voltage rail 104 is tied to ground). Of course, other configurations are possible according to various embodiments.

Various embodiments are discussed herein with respect to delivering a particular load power, load current, load voltage, etc. It will be appreciated that these various load requirements are mathematically related, and discussion of one is not intended to limit the scope of the invention or the particular embodiment. For example, where the switching converter unit 110 is described as supplying a desired load voltage (e.g., the voltage between positive voltage rail 152 and negative voltage rail 154), the switching converter unit 110 may be similarly thought of as supplying a desired load current, load power, etc.

Embodiments of the switching converter unit 110 are controlled by a converter controller unit 120. The converter controller unit 120 may provide any useful functionality relating to the control of the switching converter unit 110, including driving the switch in the switching converter unit 110, receiving and/or processing feedback from the switching converter unit 110 (e.g., current sensing, etc.), regulating the switching converter unit 110 output, error correcting, etc. Embodiments of the converter controller unit 120 receive one or more control inputs 125 (e.g., reference values, input waveforms, load control signals, etc.) for use in controlling the switching converter unit 110.

In some embodiments, the converter controller unit 120 provides a converter switching signal to the switch of the switching converter unit 110. The converter switching signal may be a substantially periodic waveform running at a predetermined or adjustable switching frequency. In certain embodiments, the converter switching signal has a duty cycle (e.g., the signal is a pulse width modulated ("PWM") signal). The output of the switching converter unit 110 may be a function of the duty cycle, and embodiments of the switching converter unit 110 operate more efficiently over a range of duty cycles. For example, the efficiency of the switching converter unit 110 may increase as the duty cycle approaches 100-percent (e.g., in some cases, so long as headroom is available to account for voltage ripple).

In one illustrative embodiment, the converter controller unit 120 includes a feedback path with an error amplifier configured to compare sampled output currents from the switching converter unit 110 (e.g., the supplied load current) against a preset reference current level. As the sampled current drops below the reference level, the error output generated by the error amplifier may increase. As the error output increases, the converter controller unit 120 may increase the duty cycle of the converter switching signal (i.e., the signal may be HIGH for a larger percentage of each cycle). This may cause current to be provided to the load 150 for a longer percentage of each switching cycle, which may increase the average load current and cause the error value to decrease. As the duty cycle increases, the operating efficiency of the switching converter unit 110 may also increase.

For at least this reason, it may be desirable to control the switching converter unit 110 such that it runs within efficient ranges of duty cycles. It will be appreciated that the output of the switching converter unit 110 may be a function of both the duty cycle and the bus voltage 102. As such, a particular switching converter unit 110 output may be maintained by a variety of combinations of duty cycles and bus voltages 102. For example, at a particular bus voltage 102, an increase in duty cycle may increase the output of the switching converter unit 110 to the load 150. Similarly, at a particular duty cycle, an increase in bus voltage 102 may increase the output of the switching converter unit 110 to the load 150.

Returning to the illustrative embodiment above, the converter controller unit 120 includes a feedback path with an error amplifier configured to compare a sampled load current against a preset reference current level. As the error output increases, the converter controller unit 120 may increase the duty cycle of the converter switching signal, potentially in excess of the desired range of operation for the switching converter unit 110 (e.g., the duty cycle may be too high to account for voltage ripple). Increasing the bus voltage 102 supplied to the switching converter unit 110 may allow the duty cycle to return to an efficient operating range while maintaining substantially the same output current to the load 150.

To allow control of the bus voltage 102, embodiments of the system 100 include a bus control feedback unit 130. In some embodiments, the bus control feedback unit 130 receives information from the converter controller unit 120 regarding the duty cycle of the converter switching signal.

When the duty cycle crosses a particular threshold, the bus control feedback unit 130 may adjust the bus voltage. In other embodiments, the converter controller unit 120 may send a signal (e.g., a flag, a pulse, a message, etc.) to the bus control feedback unit 130 indicating that the bus control feedback unit 130 should either increase or decrease the bus voltage 102.

It will be appreciated that the bus voltage 102 may be controlled in a number of ways by the bus control feedback unit 130. For example, the bus voltage 102 may be adjusted discretely or continuously, directly or indirectly, by preset amounts, or as a function of input information, etc. In certain embodiments, the bus voltage 102 is adjusted by sending a signal to a bus controller unit 140. The bus controller unit 140 may be any useful type of bus voltage 102 controller or generator. For example, the bus controller unit 140 may include a first stage converter for converting high-voltage AC to high-voltage DC. In some embodiments, the bus controller unit 140 includes other functionality, like power factor correction.

Figure 2:
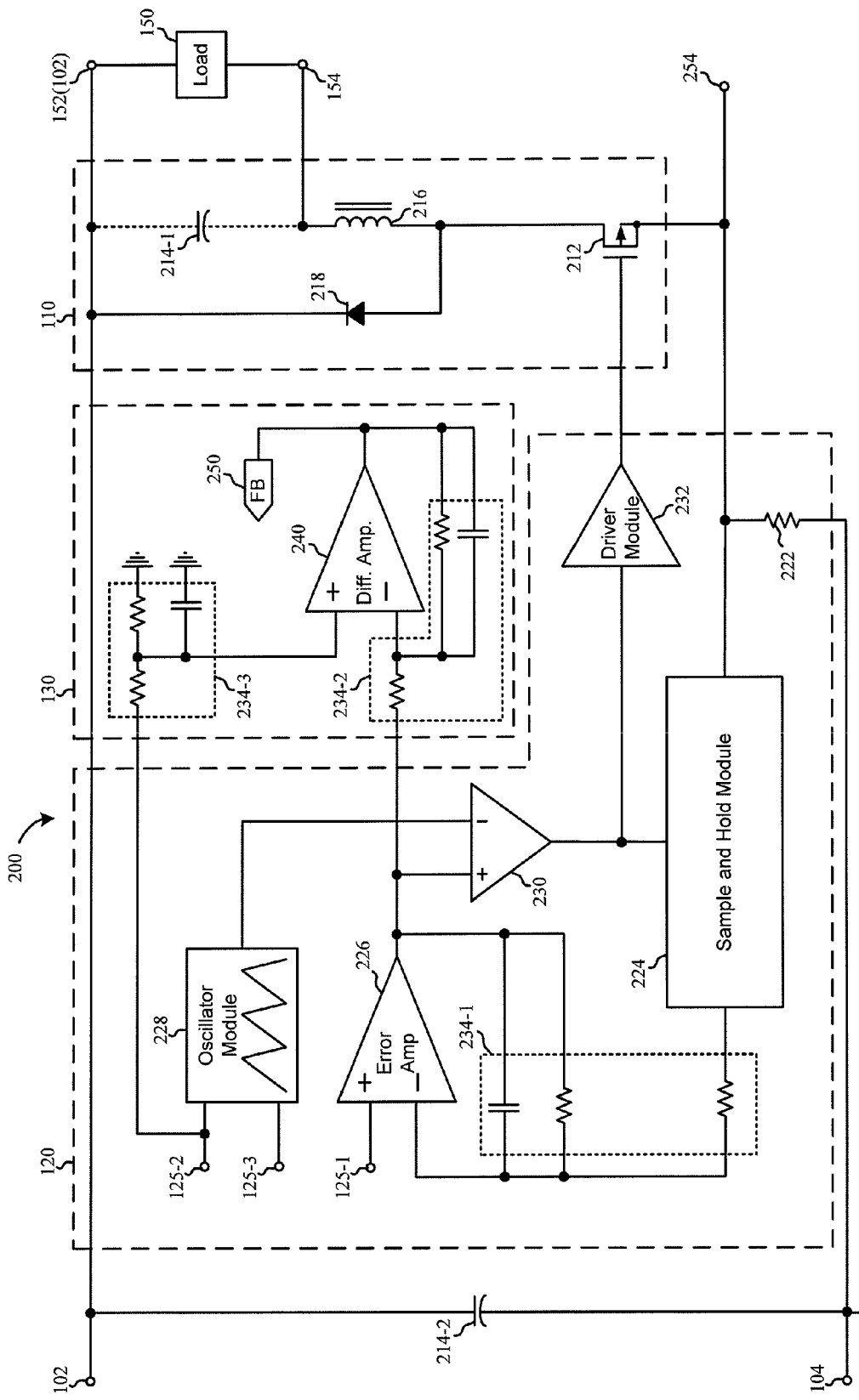
FIG. 2 shows an illustrative schematic diagram of a circuit for implementing the functionality of the system of FIG. 1, according to various embodiments of the invention.

It will be appreciated that many circuit designs and topologies are possible, according to the invention, to implement some or all of the functionality of the system 100 of FIG. 1. FIG. 2 shows an illustrative schematic diagram of a circuit 200 for implementing the functionality of the system 100 of FIG. 1, according to various embodiments of the invention. The circuit 200 includes a buck converter powered by a DC bus 102, configured to provide power to a load 150 using a low-side switch topology (e.g., by stepping down the bus voltage). In some embodiments, the buck converter is the switching converter unit 110 of FIG. 1.

As shown in FIG. 2, the circuit 200 includes a switching converter unit 110, a converter controller unit 120, and a bus control feedback unit 130. In the embodiment shown, the switching converter unit 110 includes a buck converter topology having low-side switch 212. The source of low-side switch 212 is tied to load reference terminal 254, and the drain of low-side switch 212 is in series with a network of converter components. The network of converter components includes diode 218 in parallel with inductor 216. Inductor 216 is in series with the load 150, across which may be capacitor 214-1. The network of converter components and the load are tied to the DC bus 102.

Embodiments of the switching converter unit 110 are controlled by the converter controller unit 120. The converter controller unit 120 includes various components for sensing output from the switching converter unit 110, including components for monitoring converter output (e.g., for detecting and/or sampling load current) and for adaptively generating a switching signal for driving low-side switch 212. Embodiments of the circuit 200 include current sensing resistor 222. Resistor 222 is tied to terminal 254, such that it is connected between the source of low-side switch 212 and ground 104. In this way, the current through resistor 222 may be proportional to the current through low-side switch 212.

In the low-side buck converter configuration, each cycle of current through low-side switch 212 may exhibit a large spike at the beginning of the cycle (e.g., due to inrush current, etc., caused by low-side switch 212 turning ON), a period during which the current through low-side switch 212 substantially follows the current through the load 150, and a period during which the current through low-side switch 212 is substantially zero (e.g., caused by low-side switch 212 being turned OFF). As such, the current through resistor 222 may substantially follow (e.g., be proportional to) the current through the load 150 only for a portion of each switching cycle.

Embodiments include a sample and hold module 224 to sample the current through the load 150. Practically, as discussed above, sampling the current through the load 150 may be implemented by sampling the voltage across resistor 222, which may be substantially proportional to the current through the load 150 for a portion of each switching cycle of low-side switch 212. The sampled voltage may be the voltage at terminal 254. Components of the sample and hold module 224 may effectively sample the voltage at terminal 254 only during the portion of each cycle during which the current through low-side switch 212 (e.g., and, therefore, the current through resistor 222) substantially follows the current through the load 150, and hold that sampled value, for example, until the next sample is recorded.

It will be appreciated that many types of sample and hold modules 224 can be used with embodiments of the invention. In one embodiment, the sample and hold module 224 includes an analog switch and a holding capacitor in parallel with resistor 222 (e.g., the capacitor is connected between terminal 254 and ground 104). The voltage across the holding capacitor may substantially track the voltage developed by the current through resistor 222 when the analog switch is closed. When the analog switch is opened, the holding capacitor may substantially hold its value. In this way, the analog switch and the holding capacitor may create a sample and hold circuit to sample the current through resistor 222. For example, if the analog switch opens just prior to when low-side switch 212 opens, the holding capacitor may effectively hold (e.g., memorize) a value close to the maximum current through the load.

The analog switch may be driven and/or controlled by an analog switch driver, configured to sample the current through resistor 222 only during times when the value may be accurately used to estimate the current through the load 150. For example, the analog switch driver may drive the analog switch to close during each switching cycle, but only during portions of the switching cycle that are relevant to a determination of the current through the load 150. In certain embodiments, the analog switch driver includes a delay gate to generate desired delay for the operation of the analog switch. In other embodiments, the delay inherent in other circuit elements (e.g., in a gate driver module 232 used to drive low-side switch 212, as described below) may be sufficient to eliminate the need for other delay circuitry in the analog switch driver.

The analog switch driver may also include blanking functionality, such that the analog switch only begins sampling after a delay (e.g., after the spike in switch current). In certain embodiments, the blanking delay is preset, while in other embodiments, the blanking delay is adjustable. For example, the blanking delay may be adjustable by providing external selectable components (e.g., pin outs on the IC) or as a function of feedback from other portions of the circuit 200. Embodiments of the analog switch driver may also drive the analog switch to be open (e.g., not be sampling) during the portion of each cycle where the current through resistor 222 is substantially zero. This and other techniques may be used to effectively sample the sensed current without corrupting the result with the non-correlative portions of the switch current waveform (e.g., when there are spikes or zero current values).

It will be appreciated that other functionality may be integrated into the sample and hold module 224. In some embodiments, an integration circuit is provided to remove any noise and/or effectively average the values being sampled during each sampling period. In other embodiments, the sample and hold module 224 includes a buffer. The buffer may include any type of buffering component or components known in the art. Further, the gain of the buffer may be unity or some other useful value. In some embodiments, the holding capacitor is designed with a small capacitance value to help rapidly and accurately sample and hold the voltage at terminal 254 (e.g., and possibly to increase the number of components that may be integrated onto an IC). To avoid discharging the holding capacitor through other components of the circuit (e.g., through feedback circuitry), it may be desirable to provide the buffer with high input impedance.

In some embodiments, a load signal is sent to an error amplifier 226. The load signal may represent the sampled (and/or buffered) value of the voltage at terminal 254, which in turn may represent (e.g., be proportional to) the load current. In some embodiments, additional components are used to prepare the load signal for use with error amplifier 226 (e.g., to adjust the voltage, impedance, etc.). The load signal may be received at one input to error amplifier 226, and an error reference signal may be received at another input to error amplifier 226. In one embodiment, the error reference signal is set by external components connected to terminal 125-1 and relates to a desired current to maintain across the load 150. In certain embodiments, the error reference signal is a reference voltage that may be fixed or adjustable.

Embodiments of error amplifier 226 compare the load signal to the error reference signal to generate an error value between the two at its output. For example, the error value may be the difference between the load signal and the error reference signal. In certain embodiments, additional loop compensation components 234-1 are provided. The loop compensation components may help shape and/or regulate the frequency response and loop stability of the circuit in one or more operating conditions.

Embodiments of the converter controller unit 120 also include an oscillator module 228, configured to generate a periodic waveform (e.g., a triangle or sawtooth wave) of a particular frequency and amplitude. The characteristics of the periodic waveform may be preset or adjustable. For example, the oscillator may be configured such that the output periodic waveform ranges from a maximum value to a minimum value, determined by a level at a first oscillator reference node 125-2 and a second oscillator reference node 125-3, respectively. For example, external components may be used to set voltage levels at first oscillator reference node 125-2 and second oscillator reference node 125-3.

Outputs from error amplifier 226 and oscillator module 228 may each be connected to input nodes of a comparator 230. In some embodiments, comparator 230 may compare the inputs to generate the converter switching signal. As such, the frequency of the converter switching signal may be a function of the frequency of the output of the oscillator module 228, and the duty cycle of the converter switching signal may be a function of the error value output by error amplifier 226. The converter switching signal (e.g., the output of comparator 230) may then be fed back to either or both of the analog switch driver and low-side switch 212. In some embodiments, the converter switching signal is applied to the gate of low-side switch 212 through a gate driver module 232. It will be appreciated that embodiments of comparator 230 may provide other functionality. For example, it may be desirable to hold output values of comparator 230 for so long as they are valid or to set particular switching thresholds (e.g., to account for noise). As such, embodiments of comparator 230 may provide "set/reset" capability, hysteresis, etc. The oscillator module 228, comparator 230, and/or other components (e.g., gate driver module 232) may be part of an integrated converter controller unit 120.

For example, in one embodiment, the output of error amplifier 226 is connected to a positive input node of comparator 230 and the output of the oscillator module 228 is connected to a negative input of comparator 230. As the current through the load 150 decreases, the error (e.g., the difference between the sampled current and the reference level at node 125-1, as reflected by the output of the error amplifier 226) may increase. This increased error value, when compared to the output of oscillator module 228 by comparator 230, may cause the duty cycle of the converter switching signal to increase. The increased duty cycle may effectively increase the load current output of the switching converter unit 110. The increased current through the load 150 may then cause the error to decrease, causing the duty cycle of the converter switching signal to decrease. In this way, the feedback control loop provided by the converter controller unit 120 may allow the current through the load 150 to be maintained to approximately a desired level, set at least in part by node 125-1.

In some embodiments, the circuit 200 includes a bus control feedback unit 130. The bus control feedback unit 130 may be configured to adjust the DC bus 102 to keep the duty cycle of the converter switching signal substantially to within a desired (e.g., efficient) range. Embodiments of the bus control feedback unit 130 effectively compare the output from error amplifier 226 against a reference level to determine whether the error is approaching or crossing some predetermined or adjustable threshold. In one embodiment, as illustrated in FIG. 2, the output of error amplifier 226 is compared against the first oscillator reference node 125-2. Because the outputs of the oscillator module 228 and error amplifier 226 are used to generate the duty cycle of the converter switching signal, a comparison of those values may indirectly provide information about the duty cycle. It will be appreciated that reference levels other than that seen at the first oscillator reference node 125-2 may be used for the comparison, according to various embodiments. For example, the comparison may use the second oscillator reference node 125-3 or some independently provided reference level.

The bus control feedback unit 130 may use a differential amplifier 240 to compare the values and generate a bus control feedback signal 250. For example, the output of error amplifier 226 is connected to a negative input of differential amplifier 240 and node 125-2 is connected to a positive input of differential amplifier 240. In one embodiment, differential amplifier 240 is an integrating differential amplifier which amplifies the voltage difference between its input by some differential gain. In some embodiments, loop compensating components 234 are provided at one or both inputs to the differential amplifier 240. The loop compensating components 234 (e.g., capacitors) may be used to obtain a slow-moving bus control feedback signal 250, which may, for example, generate a lower frequency of response of the feedback loop and improve overall system stability.

For example, as sampled load current decreases, the error between the sampled and desired currents may increase, as discussed above. This may cause the output of error amplifier 226 to increase, which may, in turn, cause the duty cycle of the converter switching signal to increase. Substantially at the same time, as the output of error amplifier 226 increases, the difference between that value and the level at node 125-2 (e.g., as seen at the inputs to differential amplifier 240) may decrease. This may cause the bus control feedback signal 250 seen at the output of differential amplifier 240 to decrease. As such, the bus control feedback signal 250 may tend to decrease as the duty cycle of the converter switching signal increases. This effect may be used to create a second feedback loop for adjusting the DC bus 102 voltage as a function of changes in the duty cycle, to keep the duty cycle within the efficient operating range of the switching converter unit 110.

The second feedback loop may include feeding the bus control feedback signal 250 back to a bus voltage controller or generator (e.g., like the bus controller unit 140 of FIG. 1) to adjust the DC bus 102.

It will be appreciated that, in some applications, a single bus may be used to power multiple converters for multiple loads. For example, a backlighting application for a flat-panel LCD display may typically include 3 strings of LEDs (e.g., Red, Green, and Blue) to generate high quality white illumination with a desired color temperature. It may be necessary or desirable to precisely and independently control the current through each LED string as well as other adjustments. This may, for example, compensate for lot-to-lot variations, voltage and efficiency variation with temperature, aging, etc. Without feedback compensation, these applications may tend to use significantly higher bus voltages than necessary, which may reduce the ability to optimize size and efficiency. This may be undesirable, for example, where weight and battery life are important to the application.

Figure 3:
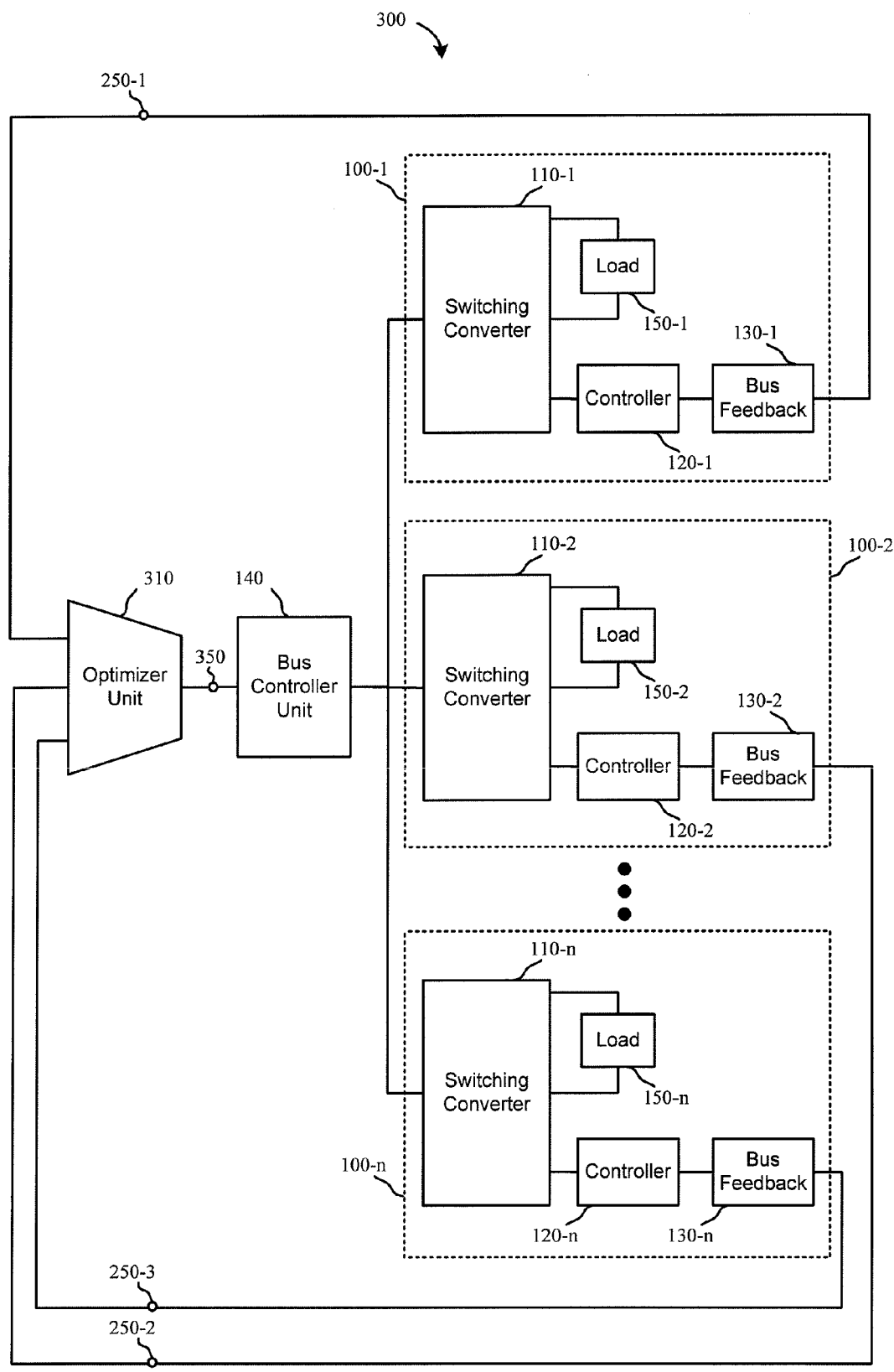
FIG. 3 shows a simplified block diagram of a system for controlling bus voltage using feedback from multiple converters, according to various embodiments of the invention.

As such, it may be desirable to provide multiple feedback processing functionality to handle bus voltage in the context of multiple switching converters. FIG. 3 shows a simplified block diagram of a system for controlling bus voltages using feedback from multiple converters, according to various embodiments of the invention. The system 300 includes multiple converter systems, 100-1-100-n, each running off a common bus voltage. Each converter system 100 may include a switching converter unit 110, controlled by a converter controller unit 120, and configured to power a load 150 and to generate a bus feedback signal 250 using a bus control feedback unit 130. For example, the converter systems 100 may be implemented as shown in FIG. 2, and used to generate the bus feedback signals 250 accordingly.

In some embodiments, the multiple bus feedback signals generated by the multiple bus control feedback units 130 pass to an optimizer unit 310. The optimizer unit 310 may be any useful circuit for processing the multiple bus feedback signals to determine an appropriate bus control signal. For example, the optimizer unit 310 may include a voting circuit, analog logic, a digital microprocessor, etc.

The output of the optimizer unit 310 may be a bus optimizer signal 350. Embodiments of the bus optimizer signal 350 are generated for use in controlling the level of the bus voltage 102 used to power some or all of the converter systems 100. In some embodiments, the bus optimizer signal 350 is used to control a bus controller unit 140, which may, in turn, adjust the bus voltage 102 to an appropriate level. It will be appreciated that there are many ways to generate the bus voltage signal 350 as a function of multiple bus feedback signals 250.

Figure 4:
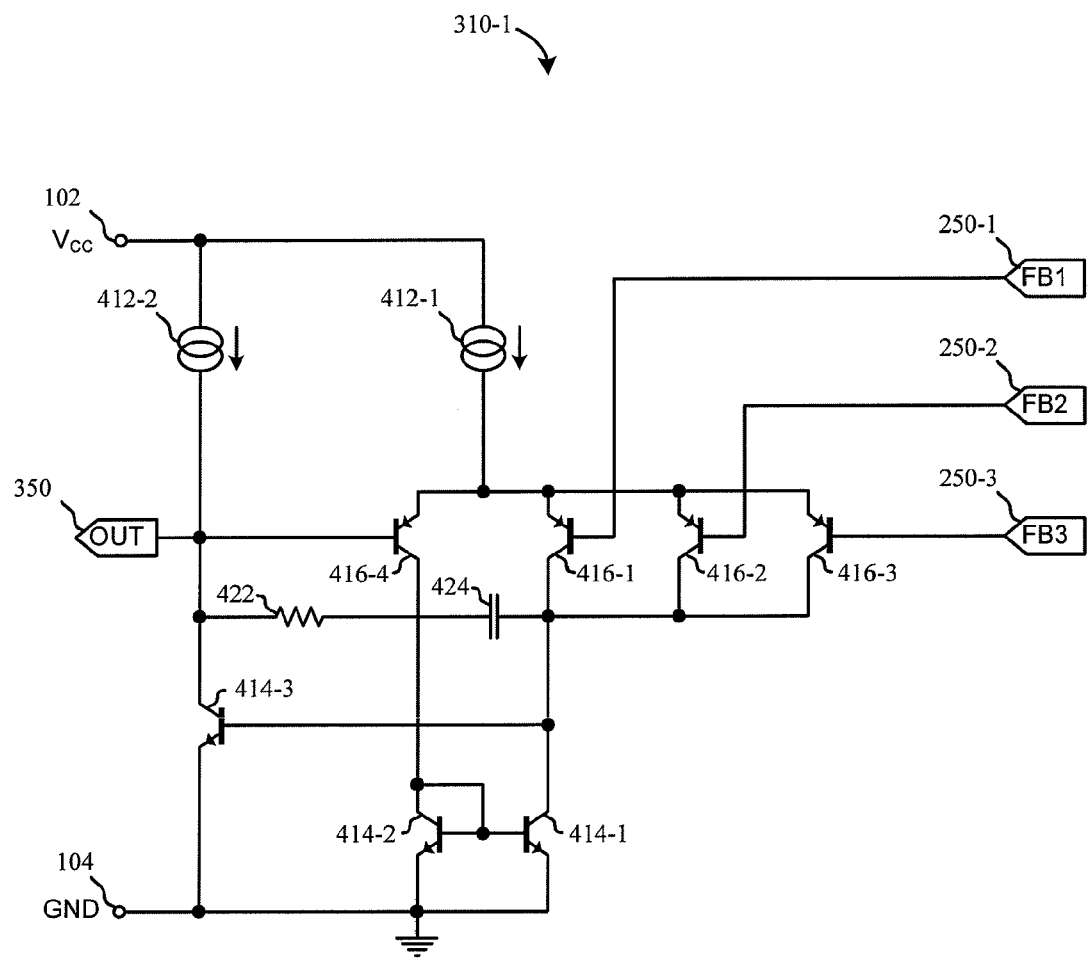
FIG. 4 shows an illustrative schematic diagram for implementing an optimizer unit, according to various embodiments of the invention.

FIG. 4 shows an illustrative schematic diagram for implementing an optimizer unit 310-1, according to various embodiments of the invention. In some embodiments, the optimizer unit 310-1 of FIG. 4 operates in the context of the system 300 of FIG. 3. As shown, the optimizer unit 310-1 receives three bus control feedback signals 250 (e.g., from multiple converter systems 100). It will be appreciated that any number of bus control feedback signals 250 is possible according to embodiments of the invention.

In certain embodiments, the optimizer unit 310-1 is implemented as a voting circuit. The voting circuit may monitor the various bus feedback signals 250, and select one bus feedback signal 250 to control output to a bus controller unit (e.g., the bus controller unit 140 of FIG. 3). For example, the bus feedback signals 250 drive a network of transistors configured to regulate current flow from a number of current sources 412. Other components may be used for added functionality, like loop compensation, filtering, etc.

In the configuration shown in FIG. 4, the bus feedback signals 250 are used to drive the gates of a network of PNP transistors 416. PNP transistors 416-1, 416-2, and 416-3 effectively act as one side of a current steering circuit, used to steer current from a first current source 412-1, where the other side of the current steering circuit is PNP transistor 416-4. The steered current is used to drive the base of NPN transistor 414-3, connected in series with a second current source 412-2. The collector of NPN transistor 414-3 is connected with the output of the optimizer unit 310-1, which is used as a bus optimizer signal 350. The bus optimizer signal 350 also drives the base of PNP transistor 416-4. The current steering network may include other components. For example, as shown, the current steering network includes NPN transistor 414-1 and NPN transistor 414-2, configured effectively as a current mirror; and resistor 422 and capacitor 424, configured effectively as loop compensation components.

It will be appreciated that the optimizer unit 310-1 may select the bus feedback signal 250 with the lowest amplitude for use in driving the bus controller unit (e.g., the bus controller unit 140 of FIG. 3). For example, the bus voltage 102 may be adjusted as a function of the bus optimizer signal 350 such that the converter system 100 operating at the highest duty cycle maintains a duty cycle of close to 100-percent (e.g., with enough margin to compensate for any ripple on the bus to help ensure desired regulation of its respective load), and other converters operate at lower, but still efficient, duty cycles. In this way, it may be possible to regulate feedback from multiple converter systems to control a single bus, while maintaining an efficient duty cycle operating range for the multiple converter systems.

Figure 5:
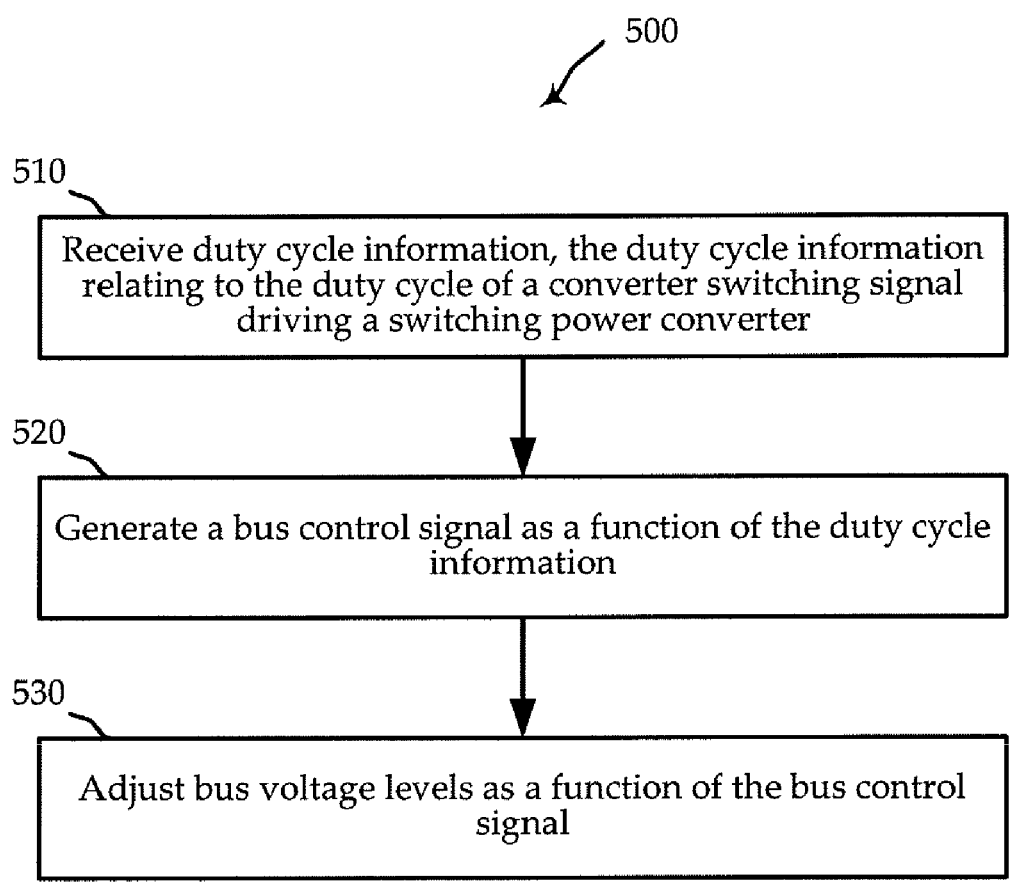
FIG. 5 shows a flow diagram of illustrative methods for optimizing bus voltage levels for a switching power converter, according to various embodiments of the invention.

FIG. 5 shows a flow diagram of illustrative methods for optimizing bus voltage levels for a switching power converter, according to various embodiments of the invention. The method 500 begins at block 510 by receiving duty cycle information, the duty cycle information relating to the duty cycle of a converter switching signal driving a switching power converter. At block 520, a bus control signal is generated as a function of the duty cycle information. In some embodiments, the bus voltage levels are adjusted as a function of the bus control signal at block 530.

Figure 6:
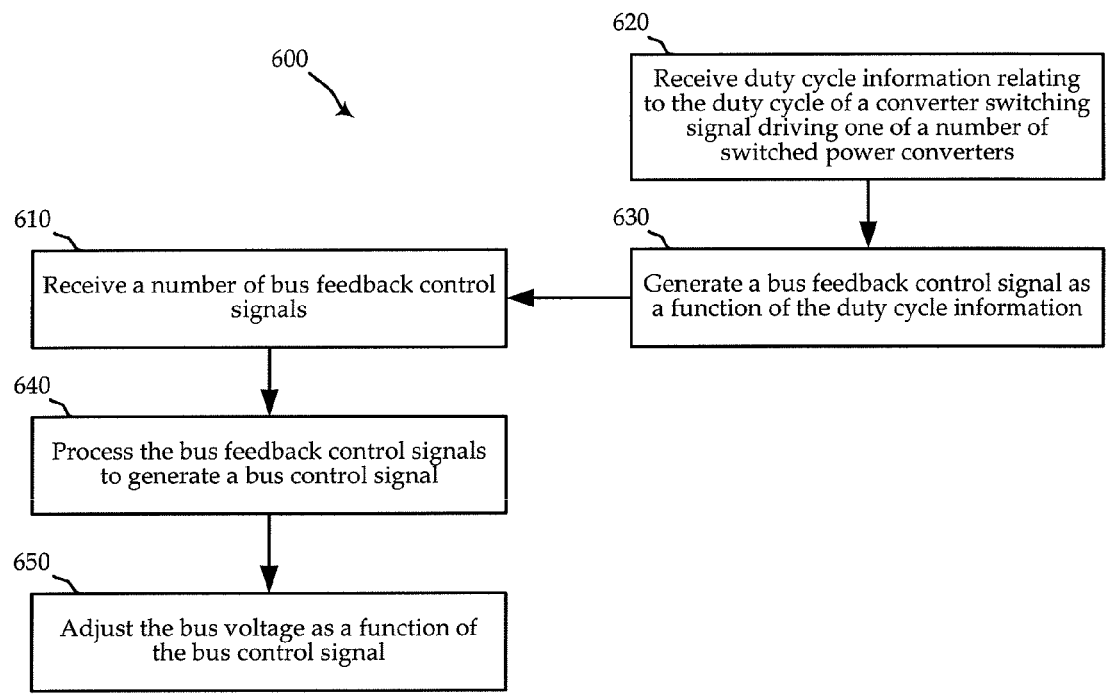
FIG. 6 shows a flow diagram of illustrative methods for optimizing bus voltage levels for multiple switching power converters, according to various embodiments of the invention.

FIG. 6 shows a flow diagram of illustrative methods for optimizing bus voltage levels for multiple switching power converters, according to various embodiments of the invention. The method 600 begins at block 610 by receiving a number of bus feedback control signals. Each bus feedback control signal may be generated by: receiving duty cycle information at block 620, the duty cycle information relating to the duty cycle of a converter switching signal driving one of the plurality of switched power converters; and generating the bus feedback control signal as a function of the duty cycle information at block 630. Each bus feedback control signal may then be processed to generate a bus control signal at block 640. In some embodiments, processing the plurality of bus feedback control signals at block 640 includes determining which of the plurality of bus control feedback signals has the lowest amplitude. In certain embodiments, the bus voltage is adjusted as a function of the bus control signal at block 650.

It should be noted that the methods, systems, and devices discussed above are intended merely to be examples. It must be stressed that various embodiments may omit, substitute, or add various procedures or components, as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

It should also be appreciated that the following systems, methods, and software may individually or collectively be components of a larger system, wherein other procedures may take precedence over or otherwise modify their application. Also, a number of steps may be required before, after, or concurrently with the following embodiments.

Specific details are given in the description to provide a thorough understanding of the embodiments. However, it will be understood by one of ordinary skill in the art that the embodiments may be practiced without these specific details. For example, well-known circuits, processes, algorithms, structures, waveforms, and techniques have been shown without unnecessary detail in order to avoid obscuring the embodiments.

Further, it may be assumed at various points throughout the description that all components are ideal (e.g., they create no delays and are lossless) to simplify the description of the key ideas of the invention. Those of skill in the art will appreciate that non-idealities may be handled through known engineering and design skills. It will be further understood by those of skill in the art that the embodiments may be practiced with substantial equivalents or other configurations.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Accordingly, the above description should not be taken as limiting the scope of the invention, as described in the following claims.

What is claimed is:

1. A circuit comprising:
   a converter controller unit, operable to:
      generate an output error as a function of monitoring an output level of a converter unit with respect to a target output level; and
      control a duty cycle of a switching signal as a function of the output error; and
   a bus controller unit, communicatively coupled with the converter controller unit, and operable to:
      generate a bus control signal as a function of the duty cycle of the switching signal; and
      adjust a bus voltage level as a function of the bus control signal such that the duty cycle of the switching signal is maintained substantially within a predefined operational range.

2. The circuit recited in claim 1,
   wherein the bus controller unit is operable to generate the bus control signal as a function of the duty cycle of the switching signal by comparing the output error generated by the converter controller unit against a threshold output error level.

3. The circuit recited in claim 1,
   wherein the bus controller unit is operable to decrease the bus voltage level when the duty cycle of the switching signal approaches a threshold minimum duty cycle.

4. The circuit recited in claim 1,
   wherein the bus controller unit is operable to increase the bus voltage level when the duty cycle of the switching signal approaches a threshold maximum duty cycle.

5. The circuit recited in claim 1, wherein the converter controller unit comprises:
   a sampling unit, operable to monitor the output level of the converter unit by sampling a representative level at a representative portion of each cycle of the switching signal, the representative level being functionally related to the output level;
   an output error generator unit, communicatively coupled with the sampling unit, and operable to generate the output error by comparing the sampled representative level against a reference level; and
   a switching signal generator unit, communicatively coupled with the output error generator unit, and operable to generate the switching signal as a function of comparing the output error against a reference periodic signal.

6. The circuit recited in claim 1, wherein:
   the converter controller unit comprises a switching signal generator unit, operable to generate the switching signal as a function of comparing the output error against a reference periodic signal, the reference periodic signal being generated as a function of a maximum threshold level; and
   the bus controller unit comprises a bus control signal generator unit operable to generate the bus control signal as a function of the duty cycle of the switching signal by comparing the output error against the maximum threshold level.

7. The circuit recited in claim 6, wherein:
   the bus control signal generator unit comprises a difference amplifier configured to:
      receive the output error at a first input node;
      receive the maximum threshold level at a second input node; and
      generate the bus control signal at an output node, such that the bus control signal is functionally related to a difference between the output error and the maximum threshold level.

8. The circuit recited in claim 6, wherein:
   the bus control signal generator unit comprises loop compensation components.

9. The circuit recited in claim 1, wherein:
   an operational efficiency of the converter unit is functionally related to the duty cycle of the switching signal; and
   the operational range of the duty cycle of the switching signal is determined to optimize the operational efficiency of the converter unit.

10. The circuit recited in claim 1, further comprising:
    the converter unit, operable to generate the output level as a function of the duty cycle of the switching signal and the bus voltage level.

11. The circuit recited in claim 10,
    wherein the converter unit is configured as a low-side switch.

12. A switched mode power supply comprising the circuit recited in claim 1.

13. A method for controlling a switching power converter, the method comprising:
    monitoring an output level of a converter unit with respect to a target output level, the converter unit being configured to generate an output level as a function of a duty cycle of a switching signal and a bus voltage level;

generating an output error as a function of monitoring the output level;

controlling the duty cycle of the switching signal as a function of the output error;

generating a bus control signal as a function of the output error; and adjusting the bus voltage level as a function of the bus control signal such that the duty cycle of the switching signal is maintained substantially within a predefined operational range.

14. The method recited in claim 13, wherein generating the bus control signal as a function of the output error comprises:

comparing the output error against a threshold output error level.

15. The method recited in claim 13, wherein adjusting the bus voltage level as a function of the bus control signal such that the duty cycle of the switching signal is maintained substantially within a predefined operational range comprises:

increasing the bus voltage level when the duty cycle of the switching signal approaches a maximum region of the predefined operational range.

16. The method recited in claim 13, wherein generating the output error comprises:

comparing a sampled representative level against a reference level, wherein monitoring the output level of the converter unit comprises sampling a representative level at a representative portion of each cycle of the switching signal to generate the sampled representative level, the sampled representative level being functionally related to the output level.

17. The method recited in claim 13, further comprising:

generating the switching signal as a function of comparing the output error against a reference periodic signal.

18. The method recited in claim 17, further comprising:

generating the bus control signal as a function of the duty cycle of the switching signal by comparing the output error against a maximum threshold level, wherein the reference periodic signal is generated as a function of the maximum threshold level.

19. The method recited in claim 18, wherein generating the bus control signal as a function of the duty cycle comprises calculating a difference between the output error and the maximum threshold level.

20. A circuit comprising:

an optimizer unit, communicatively coupled with a plurality of bus controller units, and operable to:

receive a plurality of bus control signals, each bus control signal being generated by a respective one of the plurality of bus controller units as a function of a duty cycle of a switching signal adapted for use in driving at least one of a plurality of switching converter units communicatively coupled with the respective one of the plurality of bus controller units;

generate a bus optimizer signal as a function of the plurality of bus control signals; and adjust a bus voltage level as a function of the bus optimizer signal, the bus voltage level being tied to the plurality of switching converter units, such that the duty cycles of the switching signals are maintained substantially within respective predefined operational ranges.

21. The circuit recited in claim 20, wherein the optimizer unit comprises:

a voting circuit, operable to select one of the plurality of bus control signals as a selected control signal, wherein the bus optimizer signal is generated as a function of the selected control signal.

22. The circuit recited in claim 21, wherein the voting circuit is operable to select the one of the plurality of bus control signals having a smallest amplitude as the selected control signal.

23. The circuit recited in claim 20, wherein each of the plurality of bus controller units is communicatively coupled with a converter controller unit operable to:

generate an output error as a function of monitoring an output level of at least one of a plurality of switching converter units communicatively coupled with the respective one of the plurality of bus controller units with respect to a target output level; and control the duty cycle of the switching signal as a function of the output error.

24. A method for controlling a plurality of switching power converters comprising:

receiving a plurality of bus control signals, each bus control signal being generated by a respective one of the plurality of bus controller units as a function of a duty cycle of a switching signal adapted for use in driving at least one of a plurality of switching converter units communicatively coupled with the respective one of the plurality of bus controller units;

generating a bus optimizer signal as a function of the plurality of bus control signals; and adjusting a bus voltage level as a function of the bus optimizer signal, the bus voltage level being tied to the plurality of switching converter units, such that the duty cycles of the switching signals are maintained substantially within respective predefined operational ranges.

25. The method recited in claim 24, further comprising:

selecting one of the plurality of bus control signals as a selected control signal, wherein the bus optimizer signal is generated as a function of the selected control signal.

* * * * *